United States Patent [19]

Hawe et al.

[11] Patent Number: 4,537,695

[45] Date of Patent: Aug. 27, 1985

[54] THERMAL ENERGY STORAGE COMPOSITIONS

[76] Inventors: Malcolm Hawe, 3 Broombank, Birkby, Huddersfield, West Yorkshire; David Marshall, 25 Park Dr., North Mirfield, West Yorkshire; John R. Walker, 1 Salisbury Pl., Hipperholme, Halifax, West Yorkshire, all of England

[21] Appl. No.: 621,774

[22] Filed: Jun. 18, 1984

Related U.S. Application Data

[62] Division of Ser. No. 465,379, Feb. 10, 1983, Pat. No. 4,470,917.

[30] Foreign Application Priority Data

Feb. 23, 1982 [GB] United Kingdom ............... 8205280
Feb. 23, 1982 [GB] United Kingdom ............... 8205281
Feb. 23, 1982 [GB] United Kingdom ............... 8205282

[51] Int. Cl.³ .............................................. C09K 3/18
[52] U.S. Cl. ...................................... 252/70; 252/62; 264/5; 428/402; 525/916; 525/936; 526/328; 526/909
[58] Field of Search .................... 252/62, 70; 428/402; 525/916, 936; 526/328, 909; 264/5

[56] References Cited

U.S. PATENT DOCUMENTS

| 3,576,760 | 4/1971 | Gould et al. | 252/174.13 |
| 4,003,426 | 1/1977 | Best et al. | 252/70 |
| 4,176,655 | 12/1979 | Levy | 252/70 |
| 4,209,413 | 6/1980 | Kent et al. | 252/70 |
| 4,221,259 | 9/1980 | Ronc et al. | 252/70 |
| 4,270,600 | 6/1981 | Bourdin | 252/70 |

Primary Examiner—Paul Lieberman
Assistant Examiner—Robert A. Wax

[57] ABSTRACT

Thermal energy storage compositions comprise a thermal energy storage material, for instance an inorganic hydrate that can undergo a change of hydration with accompanying release or storage of latent heat of hydration at a temperature of 10° to 100° C., held in a matrix of polymeric material, generally acrylic polymer. In one aspect of the invention the composition is in particulate form and so can, for instance, be poured into the heat exchanger in which it is to be used. In another aspect of the invention the storage material includes polyvalent metal ions and the polymeric material is a cationic polymer. In another aspect of the invention the composition is made by forming a solution, generally in water, of all the polymerizable material and most or all of the storage material and then polymerizing the polymerizable material in this solution. The solution is generally a low viscosity fluid and polymerization may be conducted in the heat exchanger vessel in which the composition is to be used.

10 Claims, No Drawings

THERMAL ENERGY STORAGE COMPOSITIONS

This application is a division of Ser. No. 465,379, filed Feb. 10, 1983, now U.S. Pat. No. 4,470,917.

There have been numerous proposals for storing thermal energy by making use of the latent heat of thermal energy storage materials. A thermal energy storage material is a compound, or mixture of compounds, that will reversably undergo a modification or change of state with accompanying release or storage of latent heat, and optionally includes also one or more promotors, such as nucleating agents, for the change of state. One suitable reversable change of state may involve fusion and solidifcation, in which event the material will absorb thermal energy while it is being converted from the solid state to the fused state but will release thermal energy when it converts from the fused state to the solid state. Another suitable reversable change of state may involve a change in the degree of hydration of a hydrate.

Such thermal energy storage materials have great potential value, for instance as a means of storing heat collected by a solar energy collector and releasing it when solar energy is not available. Unfortunately their use involves a number of serious problems.

One problem is that it is often difficult to achieve satisfactory contact, in a convenient manner, between the thermal energy storage material and a heat exchange fluid that is to transport thermal energy to or from the material. For instance efficient direct contact between heat exchange fluid and the thermal energy storage material has not been practicable and indirect contact requires that the storage material be held in containers of appropriate shape, and it can be difficult to fill the containers satisfactorily with suitable material. Another problem is that the thermal energy storage material, in one of its states, is generally heterogeneous, consisting of a mixture of a liquid phase with a small amount of a solid phase. This solid phase may be provided by nucleating agent or by material that is formed during incongruent fusion of the thermal energy storage material. There is then a tendency for the solid phase to separate from the liquid phase and this will reduce the efficiency with which the liquid phase can subsequently be returned to the solid state.

To minimise the separation of the solid and liquid phases it is known to provide a thermal energy storage composition in which the storage material is dispersed in a viscous liquid or other thickened composition. Such thickened compositions are discussed in, for example, U.S. Pat. No. 3,986,969. As explained in that patent the resultant compositions were often not entirely satisfactory, for instance because the thickening action of the thickening agent tends to degrade during use, and also the thickening systems discussed in that patent tend to be incapable of preventing separation of solid phase present in fused thermal energy storage material.

In an attempt at overcoming these difficulties it is proposed in British Pat. No. 1,584,559 and U.S. Pat. No. 4,273,667 to mix the storage material with a polymer, which in practice is a linear acrylic polymer, and then to cross-link the polymer by particular mechanisms described in those patents, so as to form a hydrogel, and then to introduce the hydrogel into the heat exchanger in which it is to be used.

One difficulty with all these systems is that the heat exchangers in which the composition is to be used are generally of complex shape, for instance thin panels, in order to facilitate indirect heat exchange between the heat exchange fluid that is to transmit thermal energy to or from the storage material. As a result of these complex shapes it can be difficult to fill the composition satisfactorily into the heat exchange vessels and this difficulty increases when the composition is in the form of a highly viscous liquid or a gel. Thus attempts at reducing the separation of solid and liquid phase by increasing the viscosity of the liquid, such as in British Pat. No. 1,584,559 and U.S. Pat. No. 4,273,667 increase the difficulty of filling the storage system satisfactorily into the vessel and in these two patents the mixture even before cross-linking is so viscous that it is difficult to fill it into some heat exchange vessels.

Another difficulty is that uniform blending of the storage material with a viscous liquid can be difficult. Blending with linear polymers can therefore be difficult and the use of previously cross-linked polyacrylates leads to serious blending difficulties. Particular difficulties can arise as a result of blending acrylic acid polymers with storage material such as calcium chloride in that it can cause uncontrolled cross-linking and insolubilisation during the blending and the resultant blended product may become even less homogeneous during storage.

Storage structures are proposed in U.S. Pat. No. 4,003,426 that comprise a matrix, in an amount of at least 25%, of a cross-linked polymeric resinous material selected from polyesters, polyvinyl esters and epoxides, and that includes cavities containing heat storage material. The product is made by dispersing the storage material in the liquid monomer and then polymerising the monomer. Although inorganic hydrate storage materials are mentioned it is difficult to obtain uniform dispersion of the heat storage material in the polymeric matrix since the storage material has to be dispersed in liquid monomer, which is then polymerised.

An entirely different approach is described in British Patent Specification No. 2031936A, in that storage material in fine particulate form is dispersed in an oil containing an emulsifying agent. However this also is not entirely satisfactory. For instance, there may be separation of either the entire thermal energy storage material or of the solid material of a heterogeneous mixture that may be formed during use of the thermal energy storage material.

It has been our object to provide new types of thermal energy storage composition that avoid or minimise the disadvantages of the known compositions, and to provide improved methods of making thermal energy storage compositions.

A thermal energy storage composition according to one aspect of the invention is particulate and comprises a thermal energy storage material held in particles of a solid, thermally conducting, matrix of polymeric material.

The particulate composition may be poured into a container of any chosen shape and may be subjected to direct or indirect contact with a chosen heat exchange fluid.

The solid form of the matrix may be required to persist only until the particulate composition is positioned in the chosen container, whereafter the particles may flow into one another, for instance when the thermal energy storage material is fused. Preferably however the matrix is substantially solid throughout use so that the particles preferably retain their identity and original shape during use or possibly agglomerate to some extent but without fusing together to give a solid mass. However it is also possible, but less preferred, for the particles to fuse during use into a solid mass provided this does not involve the matrix becoming so fluid that it permits separation of the storage material. Since the matrix is a solid, and does not become liquid during normal use, there is substantially no risk of phase separation of components of the thermal energy storage material during use.

The matrix may be a relatively rigid solid, the particles then also being relatively rigid. However the matrix may be a soft or flexible solid, and may have a texture such that the matrix of each particle can be described as a non-flowable gel. The particles may then be hard when the thermal energy storage material is solid but soft and rubbery when it is fluid, for instance above its transition temperature.

The size of the particles may be chosen from a wide range. For instance the particles may have a particle size as small as 1 micron or as large as 10 cm. The optimum size will be selected having regard to the intended use of the particles.

Thermal energy may be transmitted to or extracted from the heat storage material by direct contact with heat exchange fluid. The fluid must be chemically inert to the composition in order that it retains its shape during use, and so usually the fluid is non aqueous. For instance inert heat exchange fluid may percolate through a bed of particles of the composition. It is then generally desirable that the particles should not be too small, as otherwise there may be a risk of them being carried away with the heat exchange fluid. The particle size will be at least 0.01 cm and preferably at least 0.1 cm. Normally it will be below 5 cm, preferably below 2 cm. Particles in the range 0.5 to 2 cm are particularly preferred. Normally the particles have similar dimensions in each direction, for instance being spheres, cubes or randomly shaped particles, but if desired they may be, for instance, rod shaped.

The composition can also be used for indirect heat exchange, being fitted in an indirect heat exchanger that may be of conventional shape. In order to ensure good heat exchange between particulate composition and the heat exchange fluid it is desirable to pack the particles tightly in the heat exchanger, so as to minimise the void space between adjacent particles. Thus the shape and size of the particles is preferably such that the void space between adjacent particles is less than 50%, and preferably less than 30% (typically about 20%) by volume based on the volume of particles and the void space. It is also possible, but less preferable, to fill the void space with a heat exchange fluid that may be static in the vessel, satisfactory results then being obtainable with larger void spaces, e.g. up to 75%, although the smaller void spaces are generally preferred.

In another system it may, however, be desirable to have very fine solid particles, for instance having a particle size from 1 to 100, usually 1 to 20, microns and typically about 4 microns. These very fine particles may be used for indirect heat exchange, being poured into a suitable indirect heat exchanger with the void spaces filled by air, or they may be used in the form of a suspension in a heat exchange oil, which may be used for indirect heat exchange contact with a heat exchange fluid or may be used as a heat exchange fluid that is pumped around the heat recovery circuit. The invention includes heat exchangers containing the particulate composition.

The polymeric material that provides the matrix of the composition may be formed from a wide variety of polymerisable monomers. The preferred monomers are ethylenically unsaturated monomers, especially acrylic monomers. If the thermal energy storage material is to be present as a hydrate it is desirable that the matrix should be capable of absorbing some water. Suitable acrylic monomers include acrylic and methacrylic acid and their salts, acrylic and methacrylic esters and acrylic and methacrylic amides, preferred monomers being acrylamide, sodium acrylate and dialkyl amino alkyl(meth) acrylates and dialkylaminoalkyl(meth) acrylamides, including quaternised derivatives of the dialkylamino compounds, for instance quaternised dimethylaminoethyl acrylate. The polymer may be a Mannich base of polyacrylamide. Copolymers of 2 or more of the described monomers are often preferred.

Other polymers that may be used include polymers (including copolymers) of vinyl pyrrolidinone or vinyl sulphonic acids (that may be polymerised from aqueous solutions as described above) and styrene maleic anhydride copolymers and polymers formed from dimethylamine and epichlorhydrin. Thermosetting polymers, such as epoxies and polyesters, may be used.

The polymers are often cross-linked in the final particles. The cross-linking agent will be chosen having regard to the polymer that is to be cross-linked. Suitable cross-linking agents for use with acrylic monomers include methylene bisacrylamide, methylol acrylamide and soluble polyethylene glycol diesters. The cross-linking is often effected after formation of the particles of the matrix polymer containing the storage material.

Broadly any polymeric matrix that can provide a solid thermally conductive matrix in which the storage material is held may be used, and this requires that it should be possible both to form a substantially uniform or homogeneous blend of the storage material in the polymer and to provide this blend in the form of particles.

It is generally preferred to make the composition by blending polymerisable material with the heat storage material and then either polymerise the polymerisable material while in the form of an emulsion or dispersion (so as to form emulsified or dispersed polymer particles) or polymerising the polymerisable material to form the polymeric matrix in bulk form and comminuting the mixture during or after polymerisation.

The polymerisation should be conducted while the thermal energy storage material is homogeneously distributed with respect to the polymerisable material, and it may be necessary to thicken the system or to agitate the system in order to minimise phase separation until polymerisation has occurred. Polymerisation is preferably conducted on a solution in which both the polymerisable material and most or all of the storage material are dissolved. For instance water soluble monomer and storage material that can be in the form of a hydrate may be dissolved in the amount of water required for providing that hydrate. Polymerisation may be conducted on the solution while it is in bulk or while it is dispersed or emulsified in another liquid.

Instead of mixing the thermal energy storage material with polymerisable monomers it may be mixed with partially polymerised material, and polymerisation then completed to form the solid matrix. For instance a linear acrylic polymer may be mixed with the storage material and may then be cross-linked by reaction with a suitable cross-linking agent, for instance materials mentioned above, aldehydes such as glutaraldehyde or formaldehyde or, when the polymer contains carboxylic or sulphonic acid groups, cations or polyvalent metals.

Polymerisation of acrylic monomers may be by thermal or redox systems, including thermally decomposing initiators such as ammonium persulphate.

If it is desired that the composition be in the form of very fine particles then they are conveniently made by emulsion or suspension polymerisation, for instance inverse polymerisation (i.e. polymerisation of a water-in-oil emulsion or dispersion of water soluble polymerisable monomer, followed by recovery of the polymer if desired). Alternatively the polymer can be formed in powder form by other conventional methods. Preferably however the formation of the matrix polymer is conducted while the composition is in bulk form and the composition is then comminuted to the desired particulate form, with polymerisation being completed before or after comminution. Comminution may be achieved by, for example, extruding extrudable composition through an appropriate orifice. The composition may be extrudable as a result of the polymerisation not having been completed at that stage or, if the matrix is heat softenable, by heating the composition above its softening point.

The matrix must be thermally conducting, by which we mean that the matrix must not prevent conduction of thermal energy into and out of the storage material within the matrix. Naturally some reduction in heat transmission may have to be tolerated, but it must not be so great as to destroy the effectiveness of the thermal energy storage material. The matrix is generally of non-foamed polymer and it is then found that substantially all synthetic polymers are capable of providing a suitably thermally conducting matrix. The weight of the matrix, based on the combined weight of the matrix and the storage material, should be as low as possible. It is generally below 50% and preferably it is below 25 or even 20%. Normally it is at least 1%, preferably 5 to 15% by weight.

The thermal energy storage material is, as stated above, a compound or mixture of compounds that will reversably undergo a modification or change of state with accompanying release or storage of latent heat, and optionally includes also promotors for the change of state such as nucleating agents. Preferably it is a material that provides, after storage of latent heat, a heterogeneous system comprising a liquid phase and at least one solid phase of a different density from the liquid phase.

The modification or change of state may involve various phenomena. In its simplest form it will be reversable fusion and solidification. In another form it will involve change from one crystalline form to another. In another form it will involve chemical change, e.g. a change in the degree of hydration of an inorganic hydrate. Thermal energy storage materials that undergo such modifications or changes of state are well known in the literature and may be used in the invention. Preferably the change of state occurs at a temperature between 10° C. and 100° C., since this is the preferred temperature range for use in solar or other heat energy storage systems and preferably the change of state is accompanied by a high release or consumption thermal energy. Typically the latent heat of a suitable material is above 30 and generally above 50, and most preferably from 70 to 150, KWh/m$^3$.

Typical thermal energy storage materials include sodium sulphate and calcium chloride and other inorganic hydrates and others are disclosed in, for instance, the aforementioned British and U.S. patent specifications. Hydrates must be provided within the matrix together with sufficient water to form the desired hydrate. The particles may contain this water when formed initially. For instance sodium sulphate decahydrate or calcium chloride hexahydrate may be provided by combining the anhydrous salt in a polymerisable mixture containing sufficient water to form the desired hydrate within the matrix. Alternatively when, as is preferred, the matrix is water permeable the water content of the particles may be adjusted after their formation by evaporation or by absorption, for instance of the theoretical amount of water for forming the hydrate.

A preferred product of the invention uses a storage material that forms a hydrate in at least one of its phases and that is in an anhydrous form or the form of a low hydrate. Such products are usually more free flowing than the product obtained on hydration of the product. Thus the more free flowing, less hydrated product may be poured into the chosen heat exchange vessel and hydrated in that.

To promote the desired change of state, and in particular to promote crystallisation and prevention of supercooling, it is normal to include a nucleating agent. Suitable nucleating agents are discussed in the aforementioned British and U.S. Patent Specifications and in the literature referred to in those. The amount of nucleating agent is typically from 1 to 20% based on the amount of salt hydrate or other compound that undergoes the reversible change of state, the remainder of the storage material being the compound or compounds that will undergo reversable change of state.

The following are some examples of this aspect of the invention.

EXAMPLE 1

In this example particles of heat storage material within an acrylamide copolymer matrix are prepared and are then dispersed in oil. Polymerisation is by dispersion polymerisation. A monomer feed is prepared by mixing together

| | |
|---|---|
| NaSO$_4$ | 248.0 g |
| Borax | 28.1 g |
| H$_2$O | 314.1 g |
| Acrylamide (52.5%) | 34.2 g |
| Glacial acrylic acid | 42.0 g |
| NaOH (46.0%) | 50.7 g |
| Ammonium persulphate | 0.032 g |
| Methylenebisacrylamide | 0.954 g |

Sufficient additional water (200 g) is then added to ensure complete dissolution of all components. The above monomer feed is added dropwise to a reaction vessel containing the following reagents at 40°–50° C.

| | |
|---|---|
| Tetrachloroethylene | 400.0 g |
| SBP 11 (paraffin) | 70.0 g |
| Stabiliser | 12.0 g |

Initiation of polymerisation occurs as the vessel contents are heated to 80° C. This temperature is maintained for ¾ hr to 1 hr. The temperature is then increased to reflux and water in the azeotrope distillate was separated off. The final water content of the beads obtained is measured using a Dean and Stark apparatus. If necessary, water is added to rehydrate the beads to the correct water content for crystallisation.

A sample of beads which has been produced in this manner is dispersed in a hydrocarbon oil and the product filled into an indirect heat exchanger in which it was heated to 45° C. to allow transition. The product is then allowed to cool, and the expected crystallisation of the hydrated salt, with accompanying release of heat, is observed. This transition can be reversably repeated over many cycles.

EXAMPLE 2

In this example the matrix is formed of cross-linked polyacrylamide by gel polymerisation using a monomer and salt mixture including thermal initiator, as follows:

| | |
|---|---|
| $CaCl_2$ | 48.4 g |
| K Cl | 4.5 g |
| $SrCl_2 6H_2O$ | 1.0 g |
| Acrylamide soln (52.5%) | 15.2 g |
| Methylene bisacrylamide | 0.016 g |
| Ammonium persulphate | 0.004 g |
| $H_2O$ | 39.9 g |

The mixture is heated in a beaker on a hot plate to 75° C., when the viscosity increases and then a gel is formed. This rubbery gel is then extruded into prills having a volume of 0.05 to 5 cc.

The resultant prills are dehydrated by heating at 110° C. to form a free flowing product that is filled into an indirect heat exchanger, with the prills occupying about 80% of the volume of the heat exchanger. The prills are then rehydrated by adding the theoretical amount of water to the prills. Indirect heat exchange results in the expected reversable absorption and release of heat over many cycles.

It is mentioned above that the particulate composition can be made by a method comprising blending the storage material with partially polymerised material and it is also mentioned above that when polyacrylic acid is blended with calcium chloride there can be uncontrolled cross-linking and insolubilisation. We have found that it is possible to overcome difficulties that may occur during blending of some prepolymers with some storage materials during the formation of particulate compositions and that by the same technique it is possible to overcome the difficulties that may occur in any method of forming a thermal energy storage composition by blending a polymeric material with a thermal energy storage material that includes polyvalent metal ions.

In particular we believe that the problem has arisen from the fact that many of the polymers that have been used previously have been slightly or highly anionic, for instance being polymers of acrylic acid or copolymers of acrylamide and acrylic acid, and many of the storage materials have included polyvalent cations such as calcium and that this has caused uncontrolled cross-linking and insolubilisation of the anionic polymer.

According to a second aspect of the invention a cationic polymeric material is used. Thus a thermal energy storage composition according to this aspect of the invention comprises a thermal energy storage material that includes polyvalent metal ions and that is held in a thermally conducting matrix of cationic polymeric material.

The composition may be made by forming a blend of polymeric material and the chosen storage material in any convenient manner. Thus a solution may be formed of cationic polymerisable material and this may be polymerised while the storage material is homogeneously distributed in it, for instance as a result of being partly or fully dissolved in the solution. However the invention is of most value when the composition is made by mixing together preformed cationic polymer, water and the storage material containing polyvalent metal ions. For instance polymer may be added to a solution or dispersion of the storage material in water or, preferably, the storage material may be added to a viscous solution of the polymer in water.

The matrix may be the structure that results from this blending, but generally the blended aqueous system is subjected to further polymerisation so as to provide the matrix with a higher viscosity or to convert it to a solid. Thus the cationic polymer that is blended with storage material may be polymerisable, for instance a blend of polymer and monomer, but preferably is a cross-linkable polymer that either includes cross-linking agent or to which cross-linking agent can be added either at the time of blending with the inorganic hydrate or subsequently.

Any such cross-linking or further polymerisation may be conducted while the blend is enclosed within the heat exchange or other vessel in which it is to be used or whilst it has any other convenient shape. For instance the final polymerisation may be conducted while the composition is in the form of a slab, sheet, tubes or particles, for instance obtained by comminution of a gel formed by blending storage material with an aqueous solution of the linear polymer that is to be cross-linked or further polymerised.

The matrix in the final composition may be a viscous liquid, provided it has sufficient thickening effect to maintain the desired homogeneous distribution of the storage material, or may be a solid. The solid may be a soft or flexible solid, thus having a texture such that it can be described as a non-flowable gel, or may be a relatively rigid solid. If it is solid then thermal energy may be transmitted to or extracted from the storage material by direct contact of the composition with a heat exchange fluid that is inert to the composition, generally a non-aqueous heat exchange fluid. For instance heat exchange fluid may percolate through a bed of particles of the composition. Generally however the composition is used for indirect heat exchange, being formed or fitted in an indirect heat exchanger and used in conventional manner.

The thermal energy storage materials used in the invention may be any of those discussed above provided that the material includes at least one component that is a compound of a polyvalent metal. Preferably at least 20% and at least usually 50%, typically 80% or more, of the total weight of the thermal energy storage material is provided by the compound or compounds of polyvalent metal. Nucleating agent may be included, as discussed above.

Typical polyvalent metal compounds that may be present in thermal energy storage materials, generally as part or all of the compound that reversably undergoes a change of state, include calcium chloride hexahydrate, calcium chloride tetrahydrate, calcium nitrate tetrahydrate, barium hydroxide octahydrate and zinc nitrate hexahydrate.

The polymer is generally a homopolymer or copolymer of one or more cationic monomers, optionally with other monomers, that preferably are soluble in water and provide a linear polymer that is soluble in water. The monomers are preferably acrylic monomers. They may be cationic derivatives of acrylamide or methacrylamide for instance dialkyl amino alkyl acrylamide, but preferably are cationic derivatives of acrylic or methacrylic acid, for instance dialkylaminoalkyl esters of acrylic or methacrylic acid. In any such dialkylaminoalkyl groups the alkyl and alkylene groups generally contain from 1 to 4 carbon atoms each, and are normally methyl or ethyl groups. Preferably the dialkylamino compound is quaternised with any convenient quaternising agent, for instance methyl chloride, methyl bromide or dimethyl sulphate. Preferred monomers therefore are quaternised dimethyl or diethyl amino methyl or ethyl acrylate or methacrylate. The polymer may be a Mannich base of a polyacrylamide.

Comonomers that may be copolymerised with such monomers include acrylic and methacrylic acid, acrylic and methacrylic esters and acrylic and methacrylic amides. Copolymers of the described cationic groups with acrylamide or methacrylamide are preferred. If the polymer contains anionic groups the molar proportion of cationic groups must be higher than the molar proportion of anionic groups. Generally the polymer contains from 10 to 100%, preferably 20 to 60% cationic groups with the balance non-ionic groups, the percentages being on a molar basis.

Other suitable polymers include polymers made by reaction of methylamine and epichlorhydrin.

When the polymer is to be further polymerised after blending with the thermal energy storage material this polymerisation may follow from the inclusion of polymerisable acrylic monomer with the polymer, for instance a cross-linking agent such as methylene bisacrylamide or methylol acrylamide, or by reaction with some other cross-linking agent, for instance aldehydes such as glutaraldehyde or formaldehyde that will react with free amide groups in the polymer.

The thermal conductivity and weight of the matrix may all be as described above.

When the thermal energy storage material is a hydrate the composition may be formed with the desired amount of water for hydration in it, for instance by combining calcium chloride, polymer and sufficient water to form the desired hexahydrate or other hydrate within the matrix. Alternatively the water content of the composition may be adjusted after its formation, by evaporation or by absorption, for instance of the theoretical amount of water for forming the hydrate.

The following is an example of this aspect of the invention.

EXAMPLE 3

5 grams of a copolymer of equal parts by weight (pbw) acrylamide and quaternised dimethylaminoethyl acrylate and 54 grams of a mixture of 89.6 pbw anhydrous $CaCl_2$, 8.3 pbw KCl and 2.1 pbw $SrCl_2 6H_2O$ are blended into 47 grams water. 0.7 grams formaldehyde are added as a cross-linking agent and the mixture is immediately filled into an indirect heat exchange vessel, polymerisation and cross-linking occurring within the vessel and converting the polymeric material into a solid polymeric matrix. The product is allowed to cool and the expected crystallisation of the hydrated salt, with accompanying release of heat, is observed. This transition can be reversably repeated over many cycles.

Even when the heat storage material does not cause cross-linking of polymeric material it may still be rather difficult to obtain homogeneous blending of polymeric material and heat storage material. Another difficulty is that, as mentioned above, unless the composition is in the form of free flowing particles it can be difficult to fill the composition into the heat exchange vessel.

According to a third aspect of the invention we provide a novel process for making a thermal energy storage composition comprising a thermal energy storage material held in a thermally conducting matrix of polymeric material formed by polymerisation of polymerisable material. This process comprises forming a solution in which all the polymerisable material and most or all of the storage material are dissolved and polymerising the polymerisable material in this solution. In the preferred method of the invention a low viscosity fluid comprising or consisting of the solution is introduced into a vessel that is to serve as an indirect heat exchanger and the polymerisation is conducted in the vessel. The matrix is thus formed in situ in the vessel in which it is to be used.

The fluid must have a sufficiently low viscosity that it flows easily into conformity with the profile of the heat exchange vessel and normally has a viscosity of less than 150 poise, generally less than 100 poise, e.g. 10 to 50 poise, measured at 30° C.

The fluid may be a dispersion or emulsion in a liquid of the solution of polymerisable material. For instance an aqueous solution of monomer and storage material may be emulsified or dispersed in an organic liquid. Preferably however the fluid consists mainly or only of the solution.

A preferred method comprises forming separate solutions of the polymerisable material and the storage material and combining the solutions. The solvent is preferably water. The solution formed upon mixing the solvent, water and polymerisable material should have a low viscosity, e.g. as described above, in order to facilitate good mixing.

The polymerisable material generally consists of one or more monomers but it may contain soluble polymer or prepolymer, for instance to increase its viscosity sufficient to reduce separation of any solid material present initially in the solution or that is formed during the polymerisation. Generally however the polymerisation that occurs in the vessel should involve lengthening the polymer chains of most or all of the polymerisable material. It may also involve cross-linking with the result that the final matrix comprises cross-linked polymer.

The polymeric material that provides the matrix of the composition may be formed from a wide variety of polymerisable monomers, that may be introduced either as monomer or as prepolymer. The preferred monomers are ethylenically unsaturated monomers, especially acrylic monomers. If the thermal energy storage material is to be present as a hydrate it is desirable that the matrix should be capable of absorbing some water. Suitable acrylic monomers include acrylic and methacrylic acid and their salts, acrylic and methacrylic esters and acrylic and methacrylic amides and N-substituted amides and other monomers having sufficient solubility in the polymerisation solvent (generally water), preferred monomers being acrylamide, sodium acrylate and dialkyl amino alkyl acrylates and quaternised derivatives thereof, for example quaternised dimethylaminoethyl acrylate. Other monomers that may be homopolymerised or copolymerised include vinyl pyrrolidinone and vinyl sulphonic acid.

Suitable cross-linking agents for use with acrylic monomers include methylene bisacrylamide and methylol acrylamide and soluble condensation polymers such as polyethylene glycol diesters.

The thermal conductivity and the amount of the matrix polymer may be as discussed above.

The matrix polymer, and thus the composition, may be a viscous liquid that has a viscosity sufficiently high to hold the storage material in a stable distribution but preferably it is a solid. It may be soft and flexible, for instance being a non-flowable gel, or it may be a relatively rigid solid. The thermal conductivity of the matrix, and the amount of polymer, may be as discussed above.

The thermal energy storage material may include a nucleating agent and may be as discussed above. Preferably it is a hydrate, as discussed above, and preferred materials include sodium sulphate, calcium chloride and other inorganic hydrates as discussed in the aforementioned British and U.S. Patent Specifications.

The polymerisable material and at least some of the storage material are dissolved in the water or other chosen solvent and the mixture subjected to polymerisation. Usually at least 50%, and preferably at least 75%, by weight of the storage material (and preferably all the storage material apart from any insoluble nucleating agent) is dissolved in the initial solution. If the fluid mixture contains any undissolved storage material (e.g. nucleating agent) the fluid should be a homogeneous dispersion of the solid phase in the fluid mixture, and it may be necessary to thicken the system (e.g. by including prepolymer) or to agitate the system in order to minimise phase separation until polymerisation has occurred. If any undissolved material is present its amount should be less than 50% and preferably less than 20% of the total weight of storage material.

Polymerisation may be by thermal or redox systems, including thermally decomposing initiators such as ammonium persulphate.

The vessel in which the system is polymerised may be of any suitable shape and construction for use as an indirect heat exchanger.

When the storage material is a hydrate polymerisation is generally conducted in the presence of sufficient water to form the desired hydrate. Thus for instance sodium sulphate decahydrate or calcium chloride hexahydrate may be provided by combining the anhydrous salt in a polymerisable mixture containing sufficient water to form the desired hydrate within the matrix. The water content may be adjusted after polymerisation by evaporation or by absorption provided the matrix is water permeable.

The following are some examples of this third aspect of the invention.

EXAMPLE 4

In this example a matrix is formed in an indirect heat exchange vessel of a copolymer of acrylamide and dimethylsulphate quaternised dimethylaminoethyl acrylate (DMSqDMAEA). The matrix is formed by gel polymerisation using a monomer salt mixture including redox initiator, as follows:

| | |
|---|---|
| $CaCl_2$ | 48.4 g |
| KCl | 4.5 g |
| $SrCl_2 6H_2O$ | 1.0 g |
| Acrylamide soln (52.5%) | 7.6 g |
| DMSqDMAEA soln (68.0%) | 5.9 g |
| $H_2O$ | 41.6 g |

The mixture is added to the vessel at a temperature of 38° C. and initiated by adding $Na_2SO_3$ and $KBrO_3$ and rotated end over end to keep the solid material dispersed. A temperature rise to 60° C. is seen and after 10 minutes the vessel contents are found to exist as a rubbery gel. When a cool heat exchange liquid effects indirect heat exchange with the gel in the vessel crystallisation of the calcium chloride and heating of the heat exchange liquid is observed. The transition can be reversably repeated over many cycles without any deterioration of the sample.

EXAMPLE 5

In this example a gel composition is formed in which the polymer is cross-linked polyacrylamide by gel polymerisation using thermal initiation. A monomer/salt mixture is formed as follows:

| | |
|---|---|
| $CaCl_2$ | 48.4 g |
| K Cl | 4.5 g |
| $SrCl_2 6H_2O$ | 1.0 g |
| $H_2O$ | 39.9 g |
| Acrylamide soln (52.5%) | 15.2 g |
| Methylene bisacrylamide | 0.016 g |
| Ammonium persulphate | 0.004 g |

This mixture is introduced into an indirect heat exchange vessel and thermally polymerised with agitation at 60° to 90° C. Indirect heat exchange can be conducted satisfactorily over many cycles.

We claim:

1. A thermal energy storage composition comprising a thermal energy storage hydrate material that includes polyvalent metal ions and that is held in a thermally conducting matrix of cationic polymeric material that is water absorbent.

2. A composition according to claim 1 in which the thermal energy storage material comprises an inorganic hydrate that will undergo a change of hydration, with accompanying release or storage of latent heat of hydration, at a temperature of 10° to 100° C.

3. A composition according to claim 1 in which the polymeric material is a cationic acrylic polymer.

4. A composition according to claim 1 in which the polymeric material is selected from optionally quaternised polymers and copolymers of dialkylaminoalkyl(meth) acrylate, and optionally quaternised polymers and copolymers of dialkylaminoalkyl(meth) acrylamide.

5. In a method of making a thermal energy storage composition comprising a thermal energy storage material that includes polyvalent metal ions and that is held in a thermally conducting matrix of polymeric material by a method comprising blending the storage material with ionic polymeric material to form the matrix and water, the improvement consisting of using cationic polymeric material as the ionic material.

6. In the method according to claim 5 in which the thermal energy storage material comprises an inorganic hydrate that will undergo a change of hydration, with accompanying release or storage of latent heat of hydration, at a temperature of 10° to 100° C.

7. In the method according to claim 5 in which the polymeric material is a cationic acrylic polymer.

8. In the method according to claim 5 in which the polymeric material is selected from optionally quaternised polymers and copolymers of dialkylaminoalkyl(meth) acrylate and optionally quaternised polymers and copolymers of dialkylaminoalkyl(meth) acrylamide.

9. In the method according to claim 5 in which the polymeric material in the resulting blend is cross-linked.

10. In the method according to claim 5 in which said blending is carried out by blending the storage material with an aqueous solution of the polymeric material.

* * * * *